United States Patent

[11] 3,579,998

[72] Inventors Jean-Jacques Thibault
 Saint-Martin D'Uriage;
 Jean-Claude Boissin, Montbonnot-Saint-
 Martin, France
[21] Appl. No. 844,779
[22] Filed July 25, 1969
[45] Patented May 25, 1971
[73] Assignee L'Air Liquide, Societe Anonyme pour
 L'Etude et L'Exploitation
 des procedes Georges Claude
[32] Priority Aug. 1, 1968
[33] France
[31] 161,426

[54] CRYOGENIC PUMPING DEVICE FOR THE
 CREATION OF VERY HIGH VACUA
 7 Claims, 3 Drawing Figs.
[52] U.S. Cl. .................................................... 62/55.5
[51] Int. Cl. ..................................................... B01d 5/00
[50] Field of Search ........................................ 230/69;
 62/55.5; 417/48

[56] References Cited
 UNITED STATES PATENTS
2,831,549 4/1958 Alpert ........................... 230/69X
3,027,651 4/1962 Nerge ............................ 230/69X
3,364,654 1/1968 Westbrock ................... 62/55.5X
3,390,536 7/1968 Kreismen ...................... 62/55.5

Primary Examiner—Robert M. Walker
Attorney—Young and Thompson

ABSTRACT: A cryogenic pumping device for the creation of very high vacuum, comprising means for collecting gases at very low temperature, said collecting means including adsorption means and condensation means, the condensation means being located upstream of the adsorption means with respect to the travel of the gases, the whole being housed in a casing cooled to a moderately low temperature and formed, on the side of the passage communicating with the chamber to be pumped, by a baffle adapted to form a screen against external radiation. The adsorption means are mounted on an extension of a metal wall which forms the condensation means, each metal wall being adjacent to a segment of a cooling coil through which is circulated a fluid at very low temperature.

CRYOGENIC PUMPING DEVICE FOR THE CREATION OF VERY HIGH VACUA

The present invention relates to a pumping device for the creation of a high vacuum in a chamber, of the kind intended to cooperate with an auxiliary pumping device permitting the previous creation of a primary vacuum.

Known devices utilize means for collecting gas at a very cold temperature, constituted by adsorption means and condensation means, the whole being placed inside a casing cooled to a moderately cold temperature, which is constituted, at the side of the passage communicating with the chamber to be pumped, by a baffle which forms a screen against external radiation.

In certain forms of construction, the adsorption means are panels covered with an adsorbing product and mounted side-by-side at a distance apart from each other, while a cooled screen in the form of a baffle is mounted round openings to the exterior of the assembly of panels. This arrangement, in which the adsorption means are located downstream of the condensation means at very cold temperature, is advantageous, since it restricts the gases reaching the adsorbents to the noncondensable gases only, while at the same time they are cooled to the very low temperature during their compulsory passage in the vicinity of the condensation walls.

Pumps of this kind permit rapid creation of very high vacua which may reach $10^{110}$ mm. Hg, after a primary pumping has been carried out up to $10^{12}$ or $10^{13}$ mm. Hg. There is in fact produced a selective condensation on walls which are increasingly colder from the outer wall at a moderately cold temperature to the central unit itself at a temperature which is very considerably colder.

In practice, it was proposed to cool moderately cold walls with liquid nitrogen, while the central unit was supplied with liquid helium, it being possible to cool certain condensation walls to intermediate temperatures by the helium vapors which had already been used to cool the central unit. This device has however the disadvantage of utilizing helium in an open circuit, so that even if the vapors of this product are recovered, their reliquefaction involves a high production cost. On the other hand, liquid helium, the temperature of which is very low (4° K.) necessitates certain special means and precautions which have not yet become current practice at the present time. In addition, the known devices are extremely bulky.

The present invention is directed to improvements in devices of the type referred to above, permitting less expensive utilization and a construction which is definitely more compact.

According to the first characteristic feature, the adsorption means are mounted on an extension of a metal wall forming the said condensation means, each of the said walls being adjacent to a segment of a cooling coil supplied with very cold fluid.

This arrangement enables the cooling fluid to be employed in a closed circuit, such as is supplied by commercial generators. The arrangement of the blades and their extensions makes it possible to obtain a particularly compact unit.

In the form of construction in which the condensation means are constituted by a plurality of fins arranged in a cylindrical annular ring around adsorption means, it will be clear that there is available a large condensation surface which only permits the noncondensable gases to reach the adsorbent products, contrary to the known arrangements in which the total condensation surface area at very low temperature is not very extensive.

Other characteristic features and advantages of the invention will further be brought out in the description which follows below, given by way of example with reference to the accompanying drawings, in which.

Figure 1:
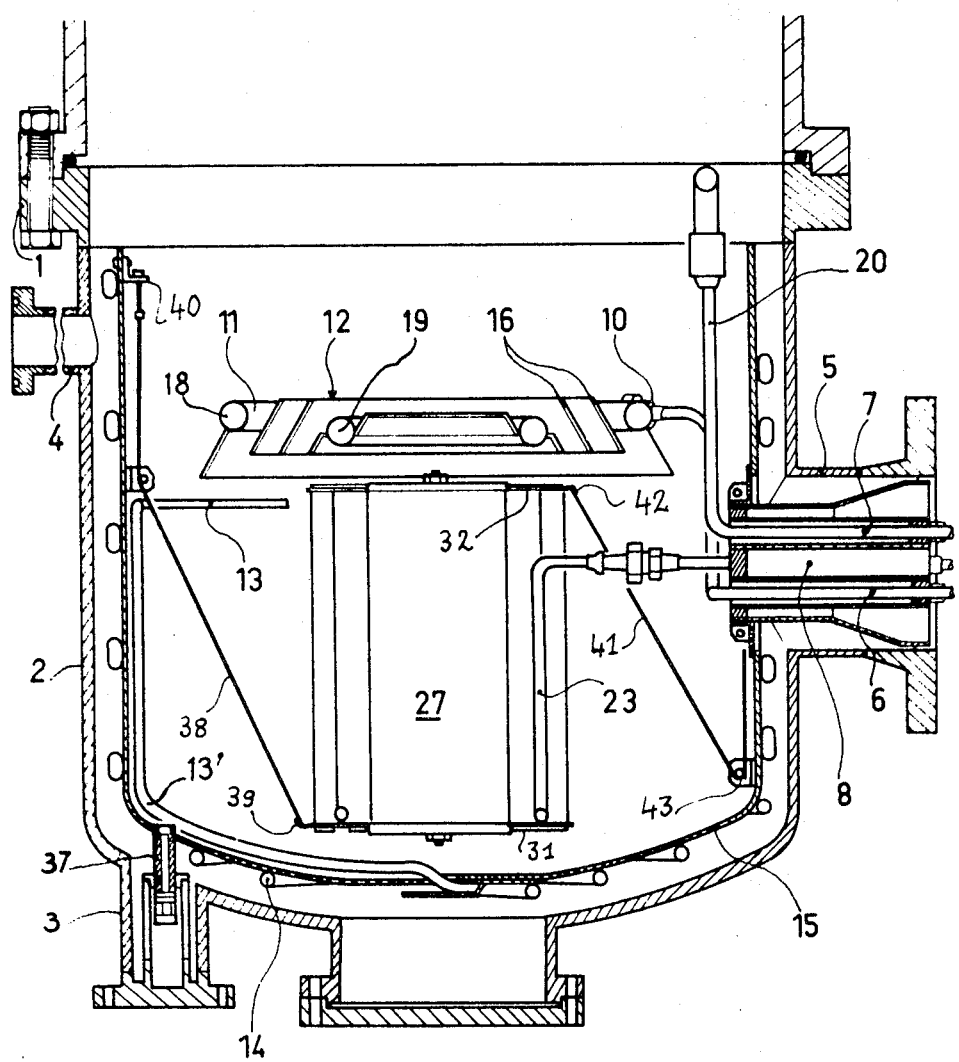
FIG. 1 is a view in vertical section of a device for creating a high vacuum in accordance with the invention.

Referring now to the accompanying drawings, the device for creating a high vacuum is essentially constituted by a cryogenic pumping device which operates by condensation and adsorption. This device is mounted in communication with the chamber to be exhausted, through the intermediary of an upper support flange 1 with a toric joint, on which is brazed a casing-tank 2, the whole system resting on feet 3.

The casing-tank 2 comprises a coupling 4 intended to be put into communication with a primary vacuum pump, and a multiple coupling 5 serving for the passage of the conduits for the cold fluids. These cold fluids conduits consist on the one hand of an inlet pipe 6 and an outlet pipe 7 for a cold fluid having a moderately low temperature, and on the other hand of an inlet pipe 8 and an outlet pipe for a fluid at very low temperature. The inlet pipe 6 for the moderately cold fluid is connected by a coupling 10, first to the cooling circuit 11 of an upper baffle or screen 12 with fins, and then by a pipe 13 to a cooling coil 14 extending to the exterior of a cold casing wall 15, mounted inside and at a short distance from the casing tank 2.

The baffle 12 is composed of a plurality of metal blades 16 of frustoconical shape, fixed to each other by radial pipe elements 17 connected between an outer ring 18 and an inner ring 19 forming part of the cooling device 11, and supplied with moderately cold fluid.

The frustoconical blades 16 are flared downwards and towards the exterior, so as to form a protection against any radiation coming from the upper portion in the direction of a central collection unit with very cold fluid, which will be described in detail later.

Figure 2:
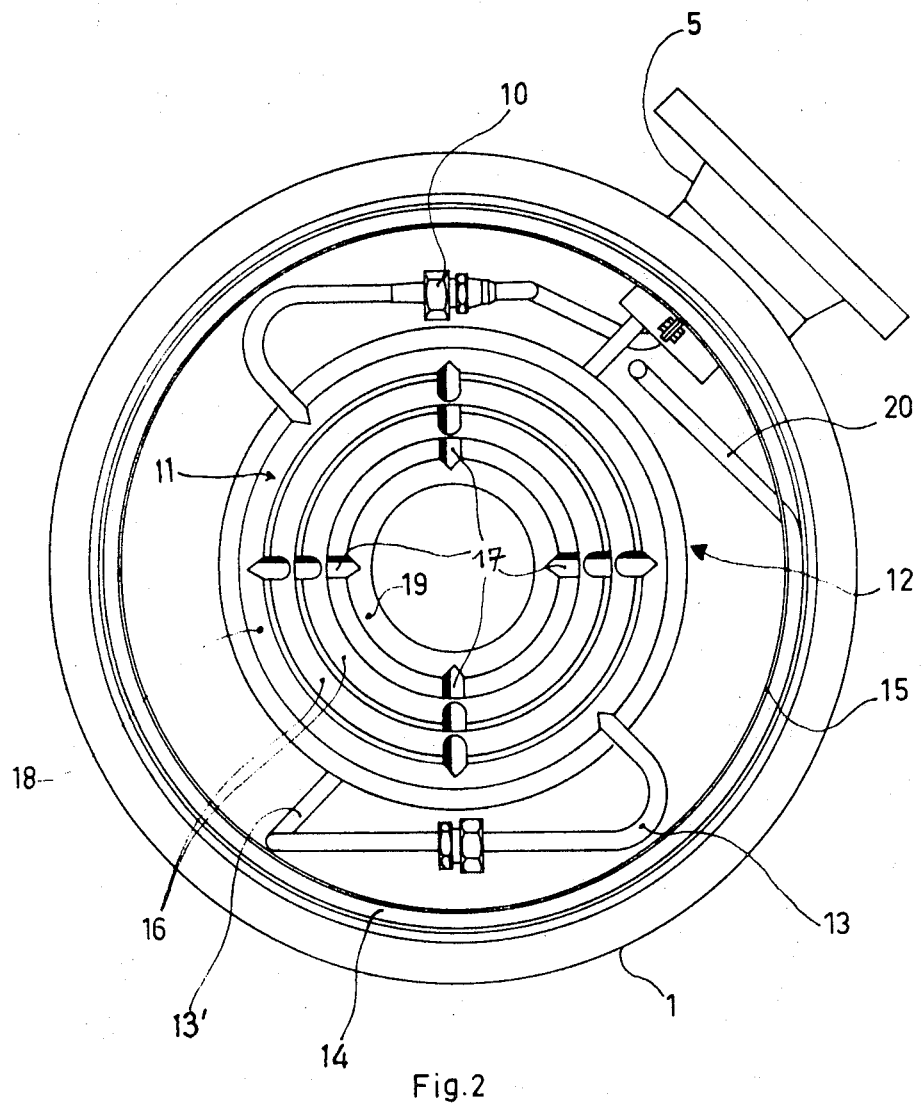
FIG. 2 is a plan view of a detail of FIG. 1.

As can be seen from FIG. 2, the conduit 13 originates from the tubular ring 18 diametrically opposite to the admission, and it extends down to the bottom of the tank at 13' so as to be connected to the coil 14. The outlet of this coil 14 is connected by a conduit 20 to the outlet pipe 7 of moderately cold fluid.

Figure 3:
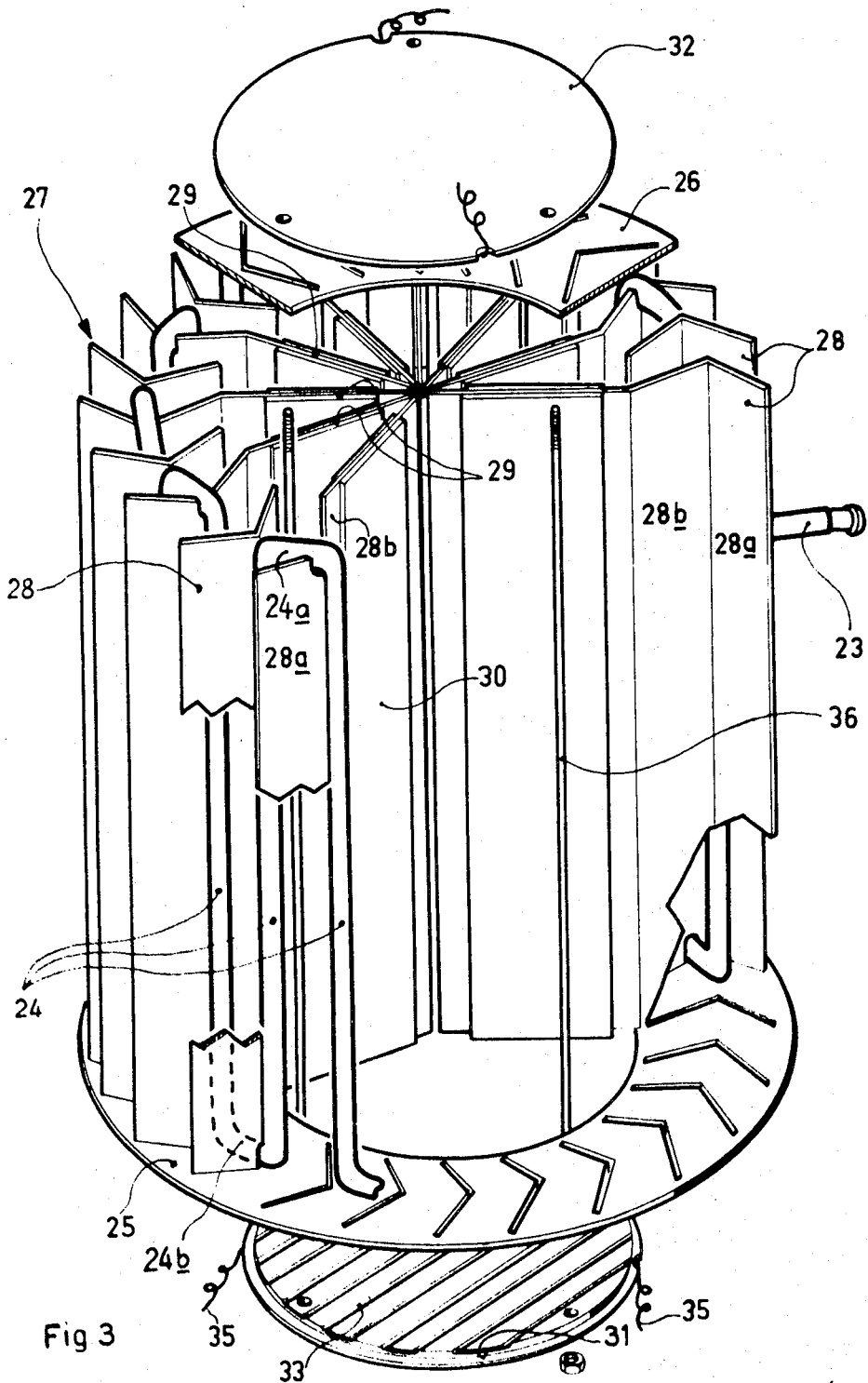
FIG. 3 is a perspective view, partly in cross section, of the internal portion of the device shown in FIG. 1.

The inlet conduit 8 of very cold fluid is connected to a coil 23 (see especially FIG. 3), essentially constituted by a plurality of straight segments 24 connected at two adjacent extremities by double elbows 24a and 24b and spaced apart peripherally between a lower end plate 25 and an upper end plate 26 of a condensation-adsorption unit 27.

Each tubular element 24 is brazed on a copper fin 28, forming two blades 28a, 28b, forming between them an angle of about 120°, the fins 28 being fixed by brazing at their upper and lower extremities to the rings 25 and 26. Each alternate fin is extended radially towards the axis by a blade portion 29 which is mechanically and thermally integral with the associated blade 28b, and each blade 29 is provided on both its faces with a plate 30 of sintered nickel forming an adsorbent.

On each end plate 25, 26 is supported a disc 31, 32, consisting of a copper plate, in which have been formed a plurality of grooves 33 serving as a housing for an electric cable acting as a heating resistance, the supply connections of which can be seen at 25. This cable is held in position by pouring over it a filling material.

The whole unit is firmly held by several tie rods 36 extending between the plates 31 and 32.

As shown in the drawing, the moderately cold casing wall 15 is carried on adjustable feet 37 incorporated in the interior of the feet 3, while the very cold temperature condensation-adsorption unit 27 is supported by cable 38 extending from the anchorage points 39 located on the lower disc 31 to an anchorage point 40 at the upper level of the cold wall 15, and held by other cables 41 extending from an anchorage point 42 on the upper disc 32 to an anchorage point 43 located towards the bottom of the casing wall 15.

The inlet and outlet conduits 7 for the moderately cold fluid, and the inlet conduit 8 and the outlet conduit of the very cold fluid are advantageously connected to the two outlets of a cryogenic generator with double flux, acting as a cooler in a closed circuit. Generators of this kind generally utilize helium in the gaseous phase, one of the circuits supplying this fluid at a temperature of the order of 80° K., and the other circuit at a temperature of the order of 15° to 20° K. It is however also possible to employ a generator with circulation of gaseous helium for the cooling circuit at very low temperature, and another cooling fluid for example liquid nitrogen, for the cooling circuit at moderately cold temperature.

The operation of the device described above is as follows:

The flange 1 being fixed to another flange of a tank bottom (not shown) in which it is desired to create the vacuum, a primary vacuum is first created by drawing off gas from the coupling 4 by which there is obtained a primary vacuum of $10^{12}$ to $10^{13}$ torr, after which a moderately cold fluid and a very cold fluid are admitted through the conduits 6 and 8 respectively. The moderately cold fluid permits cooling to a temperature of the order of 80° K. for example, of the screen with fins 12 and the casing wall 15, while the very cold fluid permits the cooling to a temperature of the order of 20° K. of the condensation-adsorption fins 28.

The small quantity of gas which remains in the chamber thus progressively passes towards the cryogenic pumping device, in which one part, constituted especially by water vapor and carbon dioxide gas, is condensed on the fin screens 12 and on the casing wall 15. The noncondensed portion then reaches the zone of the fins 28 at very low temperature. In the zone of the fins 28a, 28b, there are further condensed certain gases which had escaped the preliminary condensation, but other gases which are not condensable at a temperature of 20° K. continue their travel towards the central zone, in which they are then adsorbed by the sintered nickel 30 on the extensions of the fins 29.

It will be noted that in this case there has been reproduced a geometric arrangement such that the condensation-adsorption unit 27 at very low temperature, cannot be subjected to radiation coming from the exterior. On the one hand, the cold wall 15 encloses and protects the unit 27 from radiation, not only over the whole of its lower part, but also over its entire lateral portion, while the screen with fins protects the upper part.

We claim:

1. A cryopump device of the kind comprising means for collecting gas at very cold temperature, said collecting means comprising adsorption means and condensation means, said condensation means being located upstream of said adsorption means with respect to the travel of the said gas, the whole being housed in a casing cooled to a moderately low temperature, said casing being formed, on the side of the passage communicating with the chamber to be pumped, by a baffle forming a screen against external radiation, said adsorption means being mounted on an extension of at least one metallic wall forming at least a part of said condensation means, each of said metallic walls being adjacent to a segment of a cooling coil through which is circulated a very cold fluid.

2. A cryopump as claimed in claim 1, in which at least a part of said condensation means is constituted by a plurality of fins disposed substantially radially in a cylindrical annular ring around said adsorption means.

3. A cryopump as claimed in claim 2, in which said adsorption means comprise an adsorbent carried by a radial extension of said condensation fins, at least in part, towards the interior of said pumping device.

4. A cryopump as claimed in claim 3, in which said adsorbent is constituted by a sintered metal, and preferably by sintered nickel.

5. A cryopump as claimed in claim 2, in which said condensation fins form oblique walls with a coupling or folding line parallel to the axis of said cylindrical annular ring of fins, said walls being all identically inclined with respect to an axial plane passing through said coupling or folding line.

6. A cryopump as claimed in claim 5, in which said fins are brazed at their extremities on two annular end plates, supported externally by two solid plate-discs, said plate-discs being fixed to each other by tie rods.

7. A cryopump as claimed in claim 6, and further comprising a heating resistance for the regeneration of the adsorbent product, said resistance being incorporated in one of said plate-discs.